G. J. MARTEL.
TIRE PATCHING DEVICE.
APPLICATION FILED SEPT. 7, 1911.

1,061,391.

Patented May 13, 1913.

2 SHEETS—SHEET 1.

Witnesses:
A. A. Olson
B. G. Richards

Inventor:
Gustave J. Martel
by Joshua R. H. Potts
his Attorney.

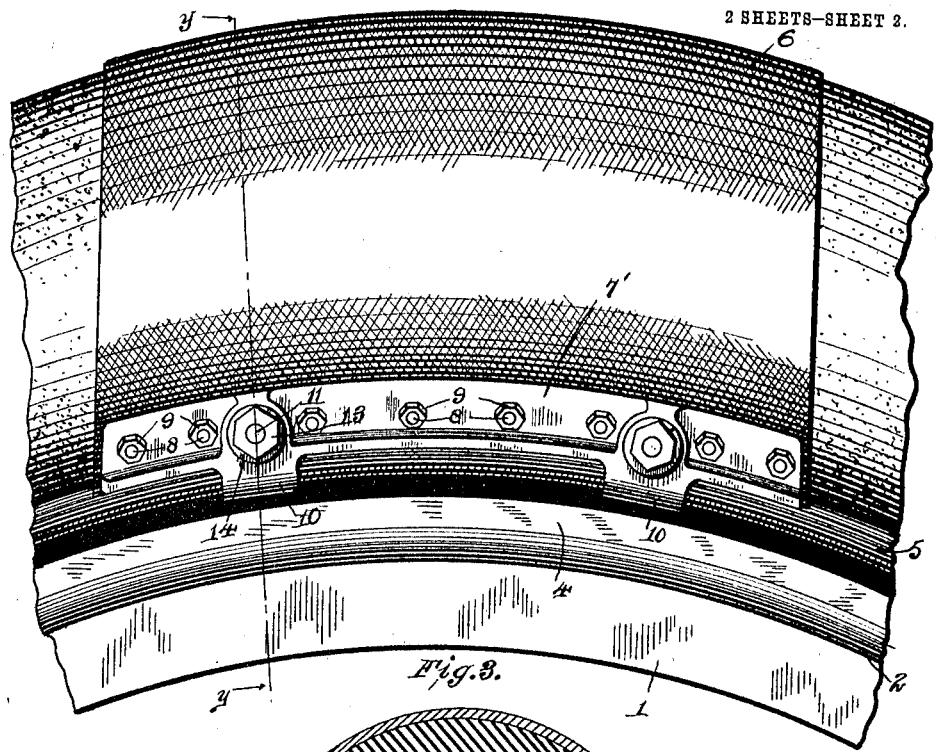

UNITED STATES PATENT OFFICE.

GUSTAVE J. MARTEL, OF CHICAGO, ILLINOIS.

TIRE-PATCHING DEVICE.

1,061,391.  Specification of Letters Patent.  Patented May 13, 1913.

Application filed September 7, 1911. Serial No. 648,134.

*To all whom it may concern:*

Be it known that I, GUSTAVE J. MARTEL, a citizen of the United States, and a resident of the city of Chicago, county of Cook, and State of Illinois, have invented certain new and useful Improvements in Tire-Patching Devices, of which the following is a specification.

This invention relates to improvements in tire patching devices and more specifically to a tire patching device especially designed for use in conjunction with a rim of the Dunlop type.

A further object is the production of a tire patching device which will be simple of construction and of high efficiency in use.

Other objects will appear hereinafter.

With these objects in view my invention consists in the combinations and arrangements of parts hereinafter described and claimed.

My invention will be best understood by reference to the accompanying drawings forming a part of this specification, and in which—

Figure 1:
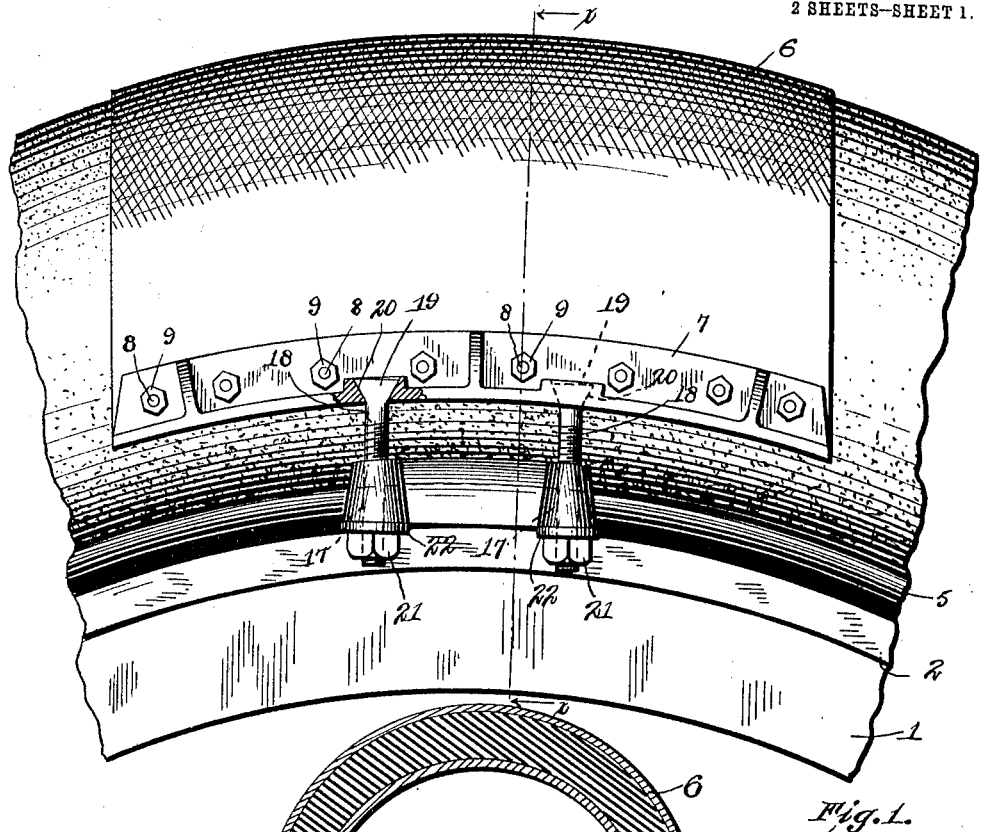
Figure 2:
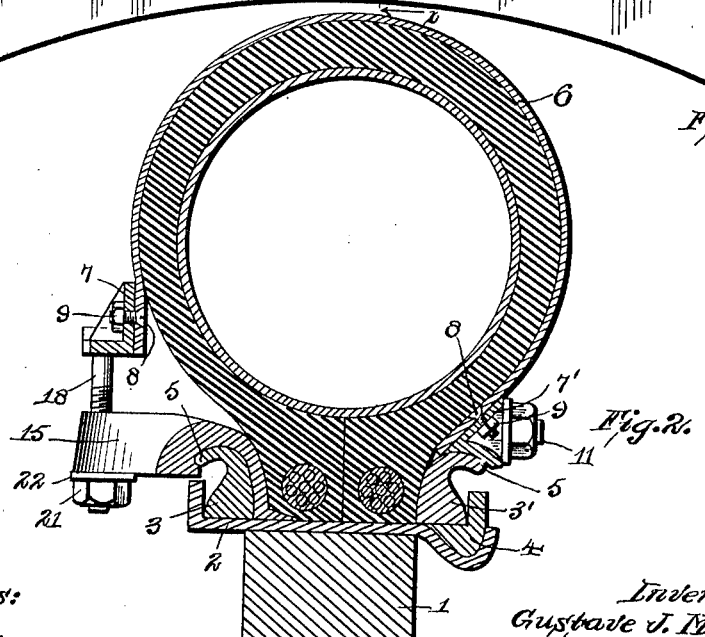

Figure 1 is a partially sectional side elevation of a fragment of a pneumatic tire and a rim upon which the same is mounted to which is applied a patching device embodying my invention, Fig. 2 is a transverse section taken on line *x—x* of Fig. 1, Fig. 3 is a view similar to Fig. 1 showing the opposite side of the construction, and Fig. 4 is a transverse section taken on line *y—y* of Fig. 3.

Referring now to the drawings I have illustrated therein a rim of the Dunlop construction, this construction as shown in the drawings comprising the body 1 of the rim upon which is mounted the channel member 2. Removably mounted in said channel member are the flanges 3 and 3' for securing the edges of the tire casing in position upon the rim, as is well known; the flange 3 abutting the stationary side of the channel 2 and the flange 3' the removable side 4. The flanges 3 and 3' are of the usual design, the same being provided with the outwardly projecting supplemental flanges 5.

Extending around the tread portion of the tire is the patching strap 6 which is formed of any durable, flexible material. Said strap is of a length coextensive substantially with the cross sectional circumference of the tread portion of the tire and of any suitable width desired. Arranged at the respective extremities of the strap 6 are metallic bars 7 and 7', the same being of angular cross section to lend strength and durability thereto and at the same time reduce the weight thereof to a minimum. Said bars 7 and 7' are secured to the strap 6 by means of screws 8 which extend therethrough at intervals and nuts 9 threaded upon said screws. Said bars are curved longitudinally so as to correspond with the curvature of the rim in conjunction with which the same are used, the bar 7' being formed so as to conform with the contour of the flange 5 and adjacent side of the tire, as clearly shown in Fig. 2. Formed upon the under side of the bar 7' are hooks 10 which engage over the adjacent flange 5 for securing said bar to said flange. Said bar is held in engaging position relative to said flange through the medium of members 11 the inner ends of which pass over the flange 3' and under the tire, the portion extending under the tire being tapered as shown in Fig. 4 in order to facilitate insertion thereof to operative position. The outer ends of the members 11 are cylindrically formed and screw threaded, the same passing loosely through perforations 12 provided for the reception thereof in the bar 7'; nuts 13 and nut locks 14 of any desired construction being provided to lock said bar 7' to said members 11. The members 11 are evidently adapted in conjunction with the nuts 13 to maintain the bar 7 in snug engagement with the adjacent side of the tire and the flange 5 of the member 3' and hence the hooks 10 of said bar in engaging position with said flange. The bar 7' and hence the corresponding end of the strap 6 will thus be securely fastened to one side of the rim.

Arranged at the opposite side of the rim is a member 15 the inner end of which is formed similar to the inner end of the member 11 for engagement with the flange member 3, the member 15 being however, provided with a hook or projection 16 for engagement under the supplemental flange 5 of the member 3, as clearly shown in Fig. 4. The outer end portion of the member 15 is provided with transversely extending perforations 17 for the reception of the lower end portions of threaded studs 18 which connect the bar 7 with the member 15. The studs 18 are removably secured at their upper ends in the bar 7 the same being provided with pyramidal heads 19 which engage correspondingly formed perforations or sockets 20 in said bar. Locking of the lower ends of the studs 18 to the member 15 is effected through the medium of nuts 21 and suitable nut locks 22. With this construction it will be observed that the strap will be adjustably secured to the tire it being clear that by threading the nuts 21 upon the studs 18 the strap may be tightened or loosened as desired, removal of said nuts effecting unlocking of the corresponding end of said strap.

A tire patching device of the construction set forth is durable and of high efficiency in use, the peculiar construction of the device whereby the supplemental flange 5 of the rim members 3 and 3' are utilized producing a construction possessing firmness and durability. The construction further is such that the device may be readily and expeditiously applied to a tire at any desired location thereon and as readily and easily removed when desired.

While I have illustrated and described the preferred form of construction for carrying my invention into effect this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A tire patching device adapted for use in conjunction with a rim having outwardly laterally projecting flanges and comprising a flexible patching strap adapted to extend over the tread portion of a tire, means for securing one edge of said strap to the rim upon one side of the tire, a bar secured to the opposite end of said strap, an inwardly extending hook on said bar adapted to engage under the adjacent flange and a member carried by said bar extending over the adjacent rim flange and under said tire, substantially as described.

In testimony whereof I have signed my name to this specification in the presence of two subscribing witnesses.

GUSTAVE J. MARTEL.

Witnesses:
 HELEN F. LILLIS,
 JOSHUA R. H. POTTS.

---

Copies of this patent may be obtained for five cents each, by addressing the "Commissioner of Patents, Washington, D. C."